(12) United States Patent
Di Giovanni et al.

(10) Patent No.: US 11,396,940 B2
(45) Date of Patent: Jul. 26, 2022

(54) LUBRICANT NOZZLE FOR A PLANETARY GEAR SET SPEED REDUCER OF A TURBOMACHINE

(71) Applicant: SAFRAN TRANSMISSION SYSTEMS, Colombes (FR)

(72) Inventors: Jean-Charles Michel Pierre Di Giovanni, Moissy-Cramayel (FR); Alexis Claude Michel Dombek, Moissy-Cramayel (FR); Boris Pierre Marcel Morelli, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 297 days.

(21) Appl. No.: 16/630,394

(22) PCT Filed: Jul. 20, 2018

(86) PCT No.: PCT/FR2018/051870
§ 371 (c)(1),
(2) Date: Jan. 10, 2020

(87) PCT Pub. No.: WO2019/016491
PCT Pub. Date: Jan. 24, 2019

(65) Prior Publication Data
US 2021/0087946 A1    Mar. 25, 2021

(30) Foreign Application Priority Data

Jul. 20, 2017  (FR) ........................................ 1756894
Dec. 7, 2017   (FR) ........................................ 1761760

(51) Int. Cl.
  *F16H 57/04*   (2010.01)
  *F16H 57/08*   (2006.01)
  (Continued)

(52) U.S. Cl.
  CPC ......... *F16H 57/0482* (2013.01); *F01D 25/18* (2013.01); *F02C 7/36* (2013.01);
  (Continued)

(58) Field of Classification Search
  CPC . F02C 7/36; F01D 25/16; F01D 25/18; F16H 1/28; F16H 57/0427; F16H 57/046;
  (Continued)

(56) References Cited

U.S. PATENT DOCUMENTS 8,667,688 B2 *  3/2014  McCune ................... F02C 7/32
                                                    29/893.1
2013/0225353 A1   8/2013  Gallet et al.

FOREIGN PATENT DOCUMENTS

CN    106594248 A  *  4/2017
CN    106594248 A     4/2017
(Continued)

OTHER PUBLICATIONS

International Search Report received for PCT Patent Application No. PCT/FR2018/051870, dated Dec. 11, 2018, 7 pages (2 pages of English Translation and 5 pages of Original Document).
(Continued)

*Primary Examiner* — Derek D Knight
(74) *Attorney, Agent, or Firm* — Womble Bond Dickinson (US) LLP

(57) ABSTRACT

A lubricant nozzle for a planetary gear set speed reducer of a turbomachine, the nozzle having a generally elongate shape and including a body with a longitudinal axis B, the body having a longitudinal inner cavity in fluid communication with a lubricant inlet located at a longitudinal end of the body and with lubricant outlet apertures that are provided in an annular wall of the body and that extend substantially radially relative to axis B, wherein the apertures are formed in at least one boss of the body, which boss
(Continued)

projects radially outwards on the wall and extends, about the axis, at an angular extent that does not exceed 180°.

11 Claims, 3 Drawing Sheets

(51) Int. Cl.
    *F01D 25/18*         (2006.01)
    *F02C 7/36*         (2006.01)

(52) U.S. Cl.
    CPC ..... *F16H 57/0431* (2013.01); *F16H 57/0456* (2013.01); *F16H 57/0479* (2013.01); *F16H 57/082* (2013.01); *F05D 2220/323* (2013.01); *F05D 2250/11* (2013.01); *F05D 2250/12* (2013.01); *F05D 2250/13* (2013.01); *F05D 2260/40311* (2013.01); *F05D 2260/98* (2013.01)

(58) Field of Classification Search
    CPC ............. F16H 57/0479; F16H 57/0486; F05D 2220/323; F05D 2240/60
    See application file for complete search history.

(56) References Cited

FOREIGN PATENT DOCUMENTS

| | | | |
|---|---|---|---|
| DE | 102008004999 A1 | 7/2009 | |
| FR | 2987416 A1 | 8/2013 | |
| FR | 3036763 A1 * | 12/2016 | ......... F16H 57/0456 |
| FR | 3041054 A1 | 3/2017 | |
| WO | 2010/092263 A1 | 8/2010 | |

OTHER PUBLICATIONS

Preliminary Research Report received for French Application No. 1761760, dated Apr. 5, 2018, 5 pages (1 page of French Translation Cover Sheet and 4 pages of original document).

* cited by examiner

LUBRICANT NOZZLE FOR A PLANETARY GEAR SET SPEED REDUCER OF A TURBOMACHINE

FIELD OF THE INVENTION

The present invention relates to the field of planetary gear set speed reducers for a turbine engine, in particular of an aircraft, as well as elements which compose a reducer of this type, such as nozzles, a planet gear carrier, an impeller, etc.

STATE OF THE ART

The state of the art comprises, in particular, documents WO-A1-2010/092263, FR-A1-2 987 416, CN-A-106 594 248, DE-A1-10 2008 004999 and FR-A1-3 041 054.

Current turbomachines, in particular turbomachines comprising one or more propellers blowing a secondary flow, comprise a transmission system, called reducer, to drive this or these propeller(s) at the correct rotation speed from the shaft of the power turbine of the primary body of the engine.

The functioning of the reducers, in particular on turbomachines with a fan propeller with a high dilatation rate, requires a particularly high oil debit, of around 6,000 to 7,000 litres per hour upon take-off, to ensure the lubrication and the cooling of their pinions and bearings.

From among the reducers used, planetary and planetary (gear set) reducers are found, which have the advantage to offer high reduction rates of the rotation speed in reduced volumes.

Such a reducer comprises a planetary pinion or central pinion, called sun gear, an outer gear ring and planet gear pinions, called planet gears, which are engaged with the sun gear and with the gear ring, the support of one of these three components having to be blocked in rotation for the functioning of the gear train.

When the planet gear carrier is fixed in rotation, the sun gear and the gear ring are leading and led, respectively, or conversely. The reducer is thus of the "planetary" type.

In the opposite case, most frequently, of a planetary gear set reducer, the outer gear ring is fixed in rotation and the sun gear and the planet gear carrier are leading and led.

However, this type of reducer has disadvantages. One of the problems is linked to the good lubrication of the gearings of the planet gears and of the sun gear. The oil must pass from one fixed portion of the engine to another portion rotating at a high speed. Once in the rotating portion, the oil is no longer pressurised. At a high speed, it is difficult to reach the sun gear with the oil, due to the centrifugation effect. It is thus essential to approach the nozzle closest to the sun gear. Another of the problems is linked to the complexity of the mounting.

The present invention proposes an improvement, which brings a simple, effective and economical solution to at least one portion of these problems.

SUMMARY OF THE INVENTION

The invention relates to a lubricant nozzle for a turbomachine planetary gear set speed reducer, said nozzle having a generally elongate shape and comprising a body with a longitudinal axis B, said body comprising a longitudinal inner cavity which is in fluid communication with a lubricant inlet located at a longitudinal end of said body and with lubricant outlet apertures which are formed in an annular wall of said body and which extend substantially radially with respect to said axis B, characterised in that said apertures are formed in at least one boss of said body, which projects radially outwards on said wall and which is at an angular extent about said axis, less than or equal to 180°.

In opposition to the prior art, a nozzle thus has more material at the level of the oil projection apertures. This addition of material has the form of a boss at the top of which the apertures open. The apertures thus have a radial dimension greater than that of the apertures of a nozzle according to the prior art, and have their ends radially outwards which are at a greater radius, and can be approached from the gearings to be lubricated. The oil passing through the apertures is guided over a longer distance and is projected closest to the gearings, which significantly optimises the lubrication of the reducer.

In the present application, by substantially radial apertures it is meant apertures which have a substantially radial orientation, i.e. that each of their axes is substantially coincident with a radius, in particular to the axis of the body.

The nozzle according to the invention can comprise one or more of the following features, taken individually from one another, or in combination with one another:

- the at least one boss has a transversal cross-section, a generally rectangular, triangular or trapezoidal shape; the shape of the boss is thus optimised to convey the oil closest to the gearings to be lubricated;
- the trapezoidal boss comprises a small base which is defined by the radially outward end of the boss on which said apertures open, and edges which together form an angle of between 0 and 90°; the volume of the bosses is thus reduced;
- the small base has a convex, curved shape, which can be obtained by turning, for example;
- said at least one boss comprises at least one row of apertures per element to be lubricated; it comprises, for example, two rows each comprising several apertures; in a variant, the apertures could have another arrangement;
- said body comprises at least two bosses at a longitudinal distance from one another; the bosses are located in favoured zones of the body of the nozzle in order to optimise the lubrication of the gearings, while optimising the volume and the mass of the nozzle; in our case, the favoured zone is defined by the number and the width of the propellers of the gearings; an extension of material can be added onto these bosses; this makes it possible, after production, to remove the material to obtain an almost identical mass on each nozzle in order to limit the imbalance of the reducer;
- the nozzle comprises a fixing leg formed of one single part with the body, said leg extending substantially in a plane perpendicular to said axis and comprising an aperture for the passing of a fixing means of the screw-nut or screw-tapped hole type; the body of the nozzle thus has a relatively simple shape, which limits its production cost;
- said body comprises at least one outer annular groove for housing a sealing ring.

According to another aspect, the invention relates to an assembly comprising a planet gear carrier and nozzles such as defined above, for a planetary gear set speed reducer of a turbomachine, said planet gear carrier comprising a cage defining an inner space for mounting a central sun gear of an axis X of rotation and of an annular row of planet gears arranged about the axis X and meshed with said sun gear, said sun gear comprising means for coupling to a first shaft, said cage comprising two substantially parallel annular walls centred on said axis X and a cylindrical wall connecting said annular walls at their outer periphery, a first of said annular walls being connected to a substantially cylindrical body comprising means for coupling to a second shaft, and a second of said annular walls comprising passages for the mounting of the nozzles, by moving each nozzle in a direction substantially parallel to said axis X, characterised in that said nozzles are configured to be mounted on said second wall from the inside of the cage.

Advantageously, the nozzles each comprise a first longitudinal portion comprising said bosses and said plate and a second threaded portion, the first portion of each nozzle being configured to extend inside of said cage and the threaded portion being intended to receive a nut intended to bear on an outer face of said cage.

The threaded portion of each nozzle can pass through, on the one hand, a housing of an impeller returned and fixed on said second wall of the cage, and on the other hand, a housing of this second wall.

According to another aspect, the invention relates to an aircraft turbomachine, characterised in that it comprises at least one nozzle or one assembly such as described above.

According to another aspect, the invention relates to a planet gear carrier and a method for assembling a planet gear carrier such as described above, wherein it comprises steps of:
fixing nozzles to the cage,
mounting planet gears and the sun gear in the cage, and fixing the impeller on the cage.

Other variants of the mounting method are naturally possible.

BRIEF DESCRIPTION OF THE FIGURES

Other features and advantages will emerge from the following description of a non-limiting embodiment of the invention in reference to the appended drawings, wherein.

DETAILED DESCRIPTION OF AN EMBODIMENT OF THE INVENTION

Figure 1:
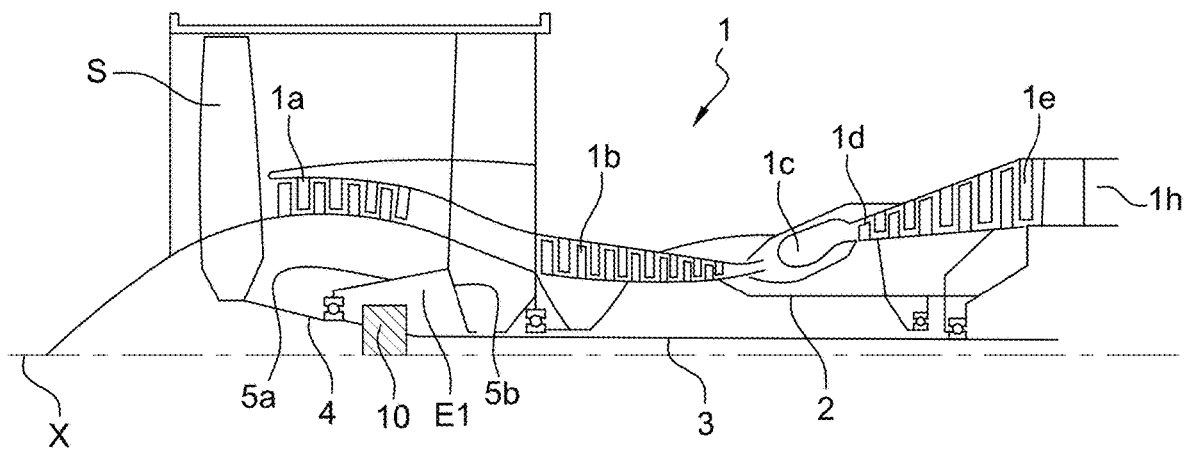
FIG. 1 is a schematic, axial cross-sectional view of a turbomachine using the invention.

FIG. 1 shows a turbomachine 1 which comprises, conventionally, a fan propeller S, a low-pressure compressor 1a, a high-pressure compressor 1b, an annular combustion chamber 1c, a high-pressure turbine 1d, a low-pressure turbine 1e and an exhaust pipe 1h. The high-pressure compressor 1b and the high-pressure turbine 1d are connected by a high-pressure shaft 2 and form with it a high-pressure (HP) body. The low-pressure compressor 1a and the low-pressure turbine 1e are connected by a low-pressure shaft 3 and form with it a low-pressure (LP) body.

The fan propeller S is driven by a fan shaft 4 which is coupled to the LP shaft 3 by means of a planetary gear set reducer 10 represented here schematically.

The reducer 10 is positioned in the front portion of the turbomachine. A fixed structure schematically comprising, here, an upstream portion 5a and a downstream portion 5b is arranged so as to form an enclosure E1 surrounding the reducer 10. This enclosure E1 is here closed upstream by seals at the level of a bearing making it possible to pass through the fan shaft 4, and downstream by seals at the level of the passing through of the LP shaft 3.

Figure 2:
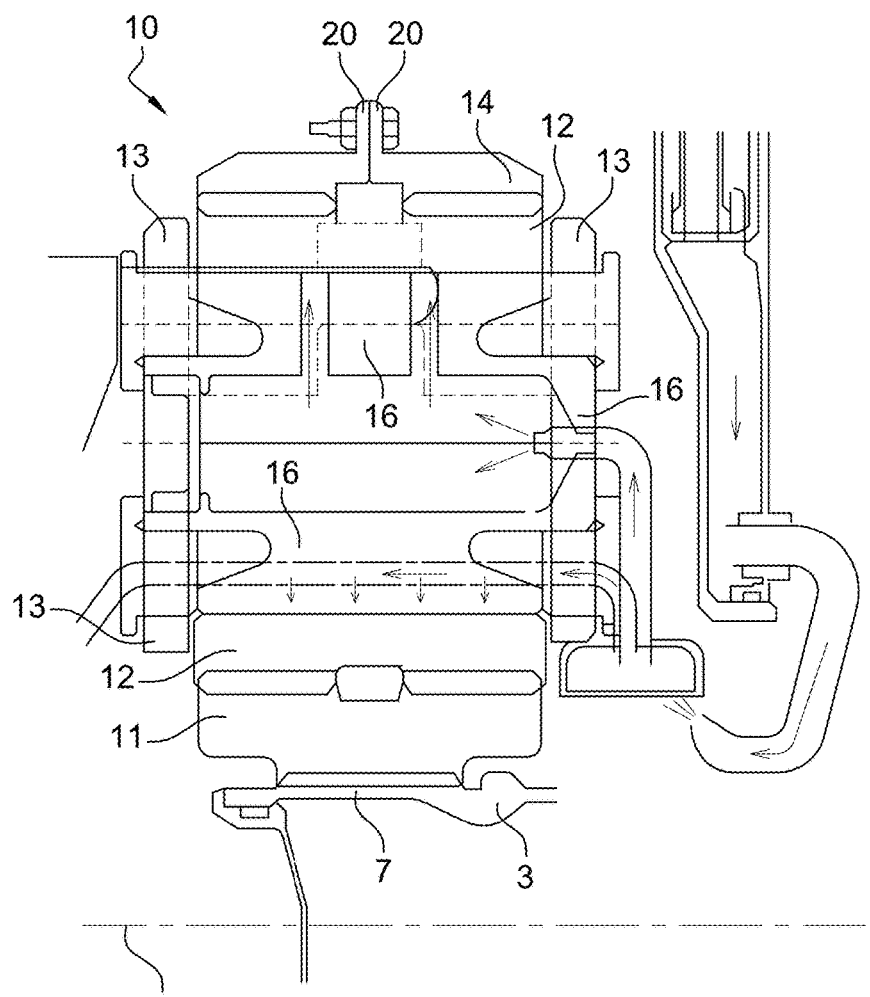
FIG. 2 is an axial cross-sectional view of a planetary gear set reducer.

In reference to FIG. 2, the reducer 10 comprises a gear ring 14 which is fixed by way of a gear ring carrier (not represented) to the fixed structure 5a, 5b, with flexible means arranged for it, to make it possible to follow possible movements of the fan shaft 4, in certain functioning cases, degraded for example. In a planetary architecture, the gear ring carrier is composed of a portion, more of less flexible, which drives the gear ring and a portion maintained by bearings and on which the fan is mounted. These fixing means are known to a person skilled in the art are not detailed here. A brief description can be found about it, for example, in FR-A1-2987416.

The reducer 10 engages, on the one hand, on the LP shaft 3 by way of slots 7 which drive a planetary gearing pinion or sun gear 11, and on the other hand, on the fan shaft 4 which is attached to a planet gear carrier 13. Conventionally, the sun gear 11, of which the axis of rotation X is combined with that of the turbomachine, drives a series of planet gear pinions of planet gears 12, which are regularly distributed over the circumference of the reducer 10. The number of planet gears 12 is generally defined between three and seven. The planet gears 12 also rotate about the axis X of the turbomachine, except in the case of a planetary gear, where they only rotate about their axes of revolution, by meshing on the inner gearings of the ring gear 14, which is fixed to a stator of the turbomachine by way of flanges 20 in the case of a planetary gear set or fixed to a rotor of the turbomachine in the case of a planet gear. Each of the planet gears 12 rotate freely about a planet gear axis/bearing 16 connected to the planet gear carrier 13, thanks to a bearing which can be smooth, as represented in FIG. 2, or a rolling element bearing (ball bearings or roller bearings).

The rotation of the planet gears 12 about their planet gear axis 16, due to the cooperation of their pinions with the gearings of the gear ring 14, drives the rotation of the planet gear carrier 13 about the axis X, and consequently, that of the fan shaft 4 which itself is linked, at a rotation speed which is less than that of the LP shaft 3.

FIG. 2 shows the conveyance of the oil towards the reducer 10 and its conveyance inside of it. Arrows show, in FIG. 2, the conveyance followed by the oil from, in this example, a buffer tank linked to the fixed structure of the turbomachine, up to the pinions and to the bearings to be lubricated. The lubrication device conventionally comprises three portions: a first portion linked to the fixed structure and delivering the oil to the rotating portions of the reducer 10, an impeller rotating with the planet gear carrier 13, receiving this oil in the case of a planetary gear set and a distributor assembled to the planet gear carrier, which are fixed onto a planetary architecture, and oil distribution circuits supplied with oil by the impeller to convey it to the places to be lubricated.

FIGS. 3 to 8 illustrate an embodiment example of a reducer 110 according to the invention.

The reference 130 designates the planet gear carrier of the reducer 110, which is here of the one-piece type comprising a portion forming a cage 134 and a portion forming a drum 142. The cage comprises two annular walls 136, 138, coaxial and connected to their periphery by a cylindrical wall 140.

The annular wall 136 is integral with the substantially cylindrical drum 142, partially visible, this drum comprising means for meshing with the fan shaft 4 of the turbomachine. The coupling means are, for example, longitudinal slots.

In the example represented, the cylindrical wall 140 is perforated and comprises through spaces 143 in the radial direction, making it possible for the mounting of planet gears 150.

Figure 5:
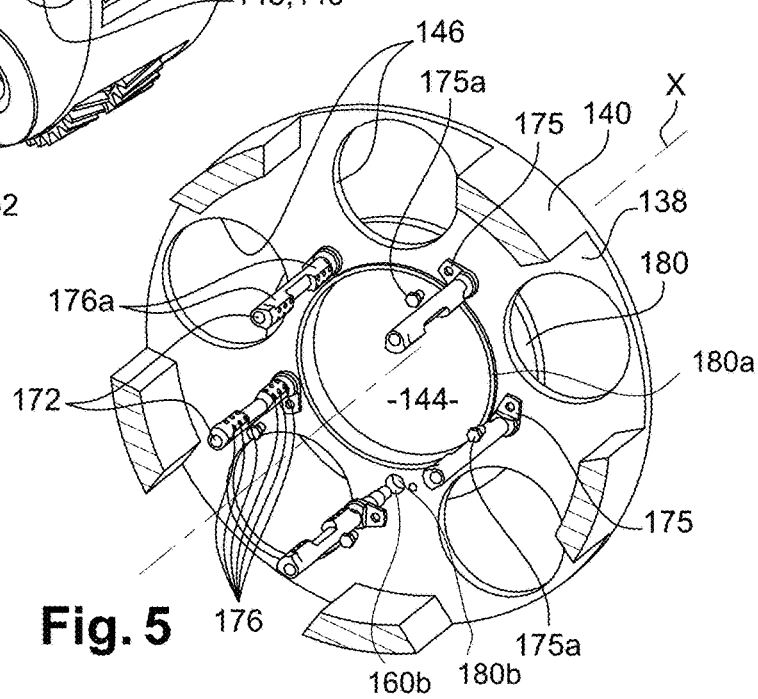
FIG. 5 is a schematic, perspective view of an assembly comprising an impeller, nozzles and a cage of the reducer of FIG. 3, this cage being partially represented.

The wall 138 comprises a central opening 144 (making it possible for the mounting of the sun gear) centred on the axis X and a series of apertures 146 regularly distributed about the axis X, the opening 144 and the apertures 146 passing through in the axial direction (FIG. 5).

Figure 4:
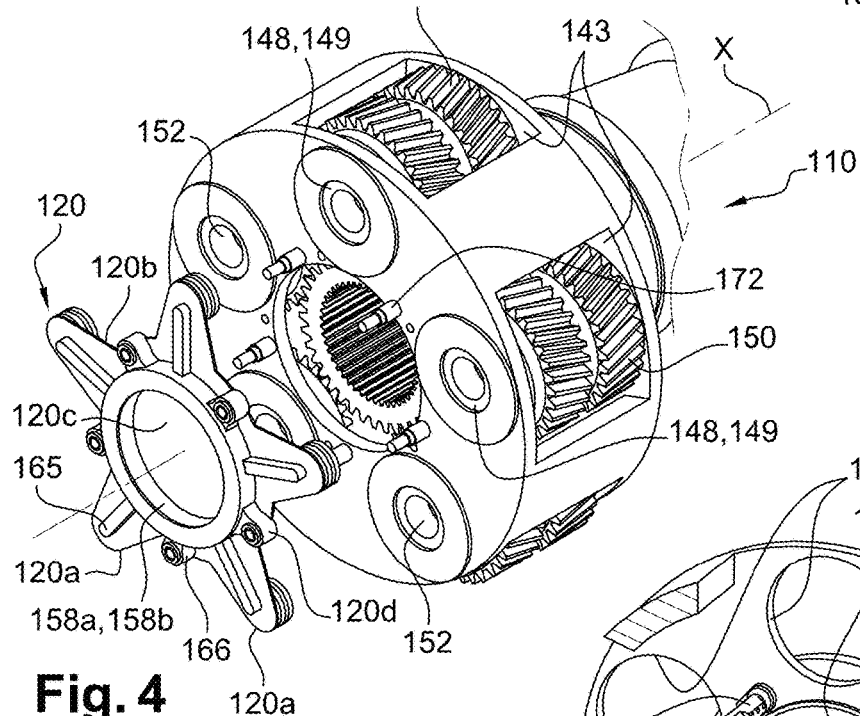
FIG. 4 is a schematic, perspective view of the reducer of FIG. 3, its impeller being disconnected from the remainder of the reducer.

The apertures 146 are used for the mounting of the axes 148 of rotation of the planet gears 150. The axes 148 are parallel to the axis X and are mounted in the cage 134 by axial translation by passing through the apertures 146. They are fixed to their longitudinal ends on the walls 136, 138, respectively. Each axis 148 is integral with a smooth bearing 149 around which the planet gear 150 is mounted (FIG. 4). The axis 148 is hollow and comprises an inner cylindrical cavity 152. The axis 148 and the bearing 149 are passed through by at least one radial conduit (which cannot be seen) which opens at its radially inner end into the cavity 152, and at its radially outer end, into a longitudinal groove of the periphery of the bearing in view of its oil supply.

As can be seen in FIG. 4, the planet gears 150 mounted in rotation on the axes 148 have their outer peripheries which partially pass through the spaces 143 in view of their meshing with the outer ring gear of the reducer 110 intended to surround the cage 134.

The planet gears 150 mesh with the sun gear 151, which comprises inner rectilinear slots 151a for coupling to another shaft such as a turbine shaft.

An impeller 120 is returned and fixed on the wall 138, on the side of its outer face, i.e. that which is not located on the side of the planet gears 150. The impeller 120 has the function of lubricating the reducer 110 and comprises lubrication means configured to bring the lubricant to the nozzles 172 and to the axes 148 and bearings 149. The oil supply of the nozzles 172 makes it possible to lubricate the meshing teeth of the planet gears 150 and of the sun gear 151, described in more detail below in reference to FIG. 8.

The impeller 120 has a generally annular shape and comprises five arms 120a radially projecting outwards, in the example represented. The impeller 120 is intended to be mounted coaxially on the wall 138 and comprises a face 120b for bearing and fixing onto this wall.

The impeller 120 comprises a central opening 120c delimited externally by an annular portion defining one or more annular grooves 158a, 158b, coaxial and axially arranged one beside the other. These grooves 158a, 158b extend around the X axis and open radially inwards. Their radially outer bottom wall comprises apertures in fluid communication with radial channels 160, on the one hand, and radial conduits 162, on the other hand (FIG. 6).

Although this is not represented, the oil is intended to be projected into the grooves 158a, 158b by lubricant supply means. These means generally comprise a series of injectors which are arranged about the axis X and pass through the apertures 120c, 144. The injectors are carried by a stator and spray lubricant radially outwards directly into the grooves 158a, 158b, which will then flow into the channels 160 and conduits 162.

Figure 3:
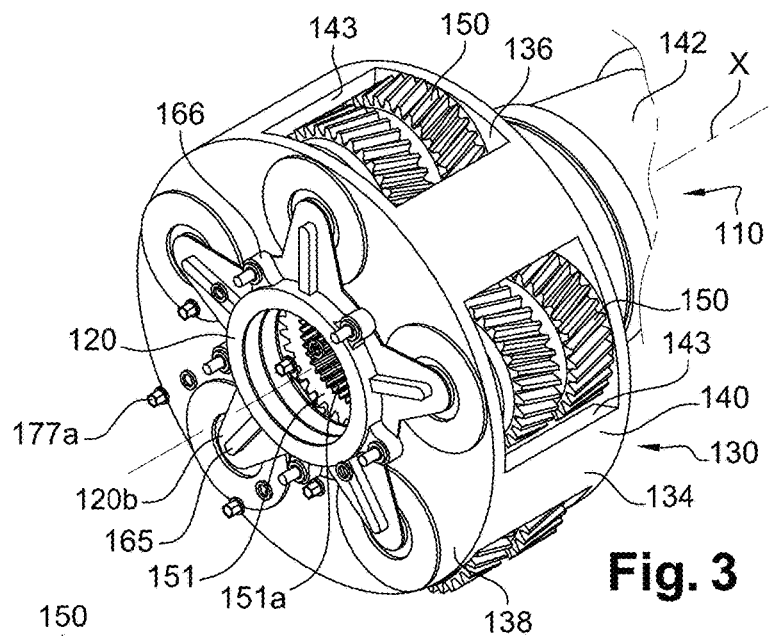
FIG. 3 is a schematic, perspective view of an embodiment of a planetary gear set reducer.

In the example represented, the number of channels 160 is equal to the number of conduits 162, which is equal to the number of axes 148 and planet gears 150. This number here is five. The channels 160 are regularly distributed about the axis X and the conduits 162 are regularly distributed about the axis X, each conduit 162 being arranged between two adjacent channels 160. The conduits and channels are formed in the excess thicknesses 165, 166 of the impeller (FIG. 3). The excess thicknesses 165, 166 wherein are formed the channels 160 and the conduits 162 extend radially outwards from the portion wherein are formed the grooves 158a, 158b. The excess thicknesses 165 wherein are formed the conduits 162 extend over the arms 120a of the impeller. It can be considered that the excess thicknesses 166 wherein are formed the channels 150 extend over fingers 120d radially projecting outwards from the impeller. The fingers 120d have a radial extent less than that of the arms 120a and are each arranged between two adjacent arms.

Figure 6:
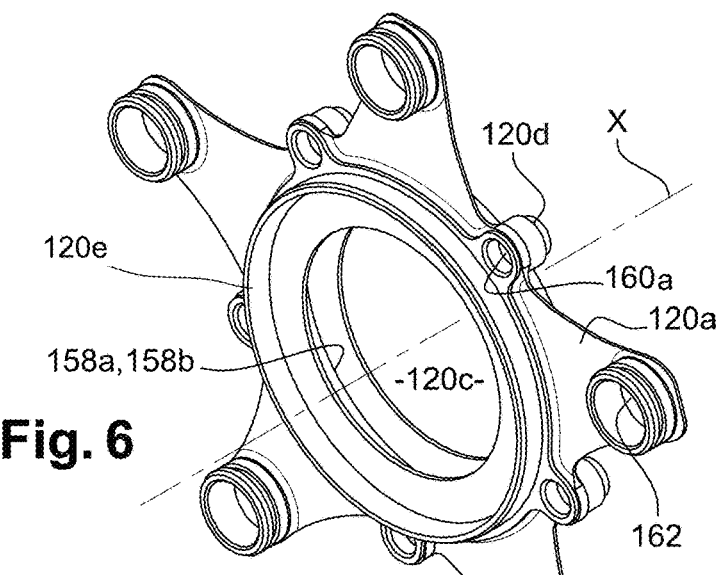
FIG. 6 is another perspective view of the impeller of the reducer of FIG. 3.

Each of the conduits 162 communicates at its radially outer end, with a cavity 152 of an axis 148 in view of supplying lubricant to this axis 148 and to the associated bearing 149 (FIG. 6). The lubricant brought by the conduits 162 is intended to be injected into the cavities 152, then to flow through the abovementioned conduits until the periphery of the bearings 149.

Figure 7:
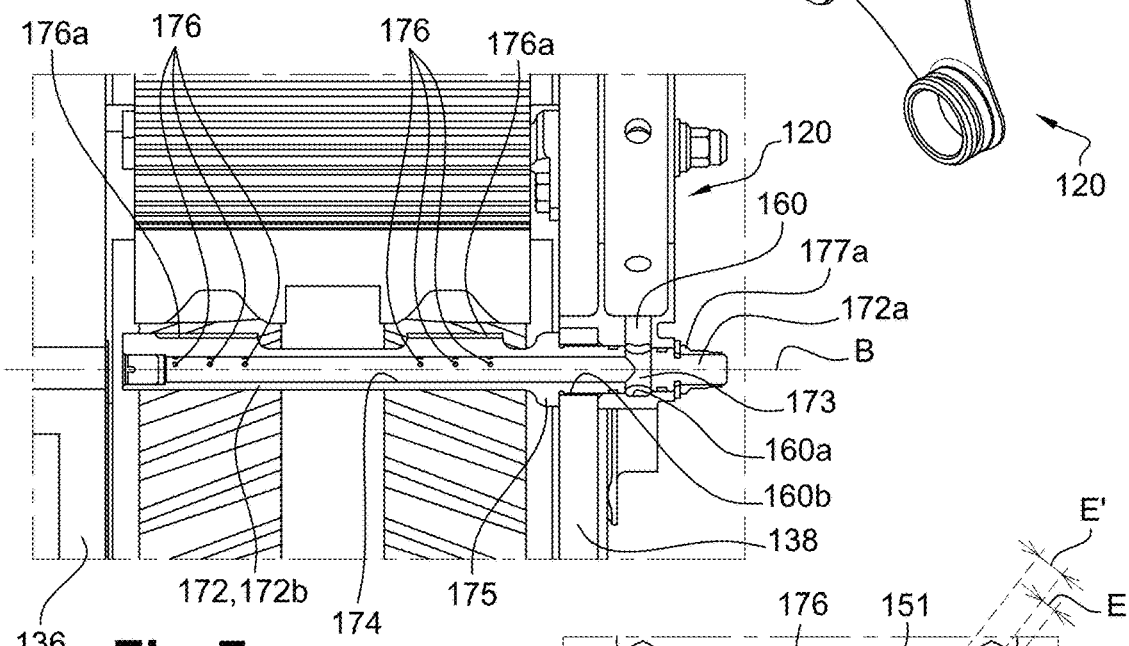
FIG. 7 is a partial, schematic, axial cross-sectional view and on a greater scale of a detail of the reducer of FIG. 3, and in particular of a nozzle of the reducer.

Each of the channels 160 communicates at its radially outer end with a longitudinal end of a nozzle 172 which can be seen, in particular in FIGS. 5 and 7. The nozzles 172 have an elongate shape and extend parallel to the axis X. Their elongate axes are referenced B. There are five of them, and they are regularly distributed about the axis X by each being arranged between two adjacent axes 148. Each channel 160 communicates with cylindrical housings 160a, 160b passing through the wall 138 and through the impeller, wherein is engaged a longitudinal end portion 172a of the nozzle (FIG. 7). The portion 172a comprises two outer annular grooves, wherein are mounted O-ring seals which engage with the wall of the housing 160a of the impeller, and which are arranged on either side of a transversal channel 173 of the portion 172a intended to be aligned with the channel 160 and therefore in fluid communication with the latter. The portion 172a comprises an outer thread at its free end and is connected to an opposite end portion 172b by a fixing leg 175. The free end of this other portion 172b is closed.

The leg 175 is formed of one single part with the substantially tubular body of the nozzle, and it extends into a plane substantially perpendicular to the longitudinal axis B of this body.

Figure 8:
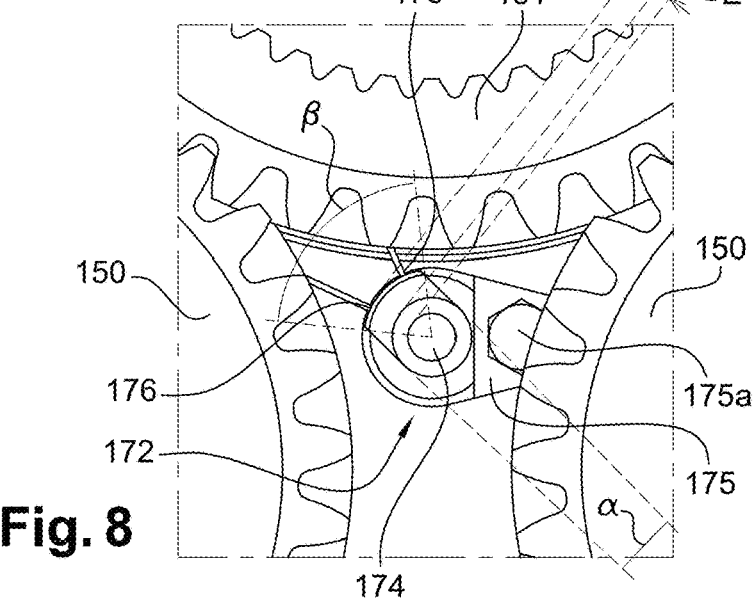
FIG. 8 is a partial, schematic, transversal cross-sectional view and on a greater scale of a detail of the reducer of FIG. 3, and in particular of a nozzle of the reducer.

As can be seen in FIGS. 5 and 8, the leg 175 is intended to be applied against the inner face of the wall 138. The leg 175 comprises an aperture for the passage of a fixing screw 175a, which is screwed into a tapped hole of the wall 138.

Each nozzle 172 comprises a longitudinal inner cavity 174 connected to the lubricant inlet formed by the channel 160a and furthermore, substantially radial apertures 176, distributed over its length, which open into the cavity 174. The lubricant brought by the channels 160 to the nozzles 172 is intended to be sprayed through the apertures 176 on the gearings of the planet gears 150 and of the sun gear 151 when functioning (see FIG. 8).

As can be best seen in FIGS. 5 and 7, the apertures 176 are formed in at least one boss 176a of the body of the nozzle, this boss 176a radially projecting outwards.

In the example represented, each nozzle 172 comprises two bosses 176a axially spaced from one another opposite the longitudinal axis B of the nozzle. Each boss 176a comprises six apertures 176 distributed in two rows of three apertures regularly spaced. The number of apertures and rows can naturally vary. In the example represented, there is a boss by tooth propeller. One row is dedicated to the sun gear and one row is dedicated to a planet gear. Moreover, in the example represented, three jets are assigned by function, but this number can vary according to the flow necessary or the distribution need of the lubrication.

Each boss 176a has an angular extent β about the elongate axis B of the nozzle, which is less than or equal to 360°, and preferably 180° (FIG. 8). Here, it has, in the transversal cross-section, a generally rectangular, triangular or trapezoidal shape. The edges of the boss 176a here are substantially parallel. Finally, as can be seen in FIG. 8, the tubular wall has a wall thickness E and each boss forms an excess thickness on this wall, which is equal to E', with E' being greater than or equal to E in the example represented. E' is present to approach the jet outlet of the sun gear and also makes it possible to increase the guiding length.

The apertures 176 are oriented such that the oil is oriented towards the gearings to be lubricated. In the example represented, the apertures of each row of each boss, project oil over a gearing, these apertures extending into a plane not parallel to that wherein extend the apertures of the other row. In the example represented, each nozzle 172 is configured to project oil over the sun gear 151 and one of the planet gears 150.

A dedicated tool 180 is positioned on the wall 138 (FIG. 5). An element for centring 180a the tool 180 makes it possible to centre it on the wall 138.

The longitudinal end position 172a of each nozzle 172 is engaged in the housing 160b of the wall 138 and in the housing 180b of the tool 180. Once the nozzles 172 are positioned through the cage and the tool, each leg for fixing 175 the nozzles 172 is supported on the wall 138 and fixed by the screw 175a. The tool 180 can thus be removed.

Then, the mounting of the sun gear, the planet gears and the impeller 120 is proceeded with. The impeller 120 comprises a centring element 120e which makes it possible to ensure the centring of the impeller 120 on the wall 180. Thanks to the elements for centring 120e the impeller 180b and the tool, the nozzles 172 have been positioned with respect to the cage 140 and to the impeller 120 with a localisation precision, sufficient to ensure the insertion of the longitudinal ends of the nozzles 172 in the housings 160a of the impeller 120, despite the statically indeterminate mounting.

A nut 177a is then screwed on each free end 172a of the nozzles 172, so as to maintain the impeller 120 in position on the cage 140.

In the mounted position of the nozzles 172 on the planet gear carrier 130 represented in FIG. 5, the bosses 176a of the nozzles are oriented rather radially inwards.

In order to approach the apertures 176 for projecting oil carried by the nozzles 172 closest to the gearings of the sun gear and of the planet gears, the invention thus proposes bosses 176a for elongating oil passages in the nozzles to these apertures, and therefore for shortening oil jets. Moreover, the nozzles 172 here are mounted through the inside of the cage 134 contrary to the prior art. The impeller 120 can be mounted prior to the assembly of the cage, or all at the end of the mounting process. The nozzles 172 are inserted in the housings 160b of the wall 138 of the cage, then can be positioned against one another using the tool 180 which temporarily replaces the impeller. Each nozzle 172 is then restrained using screws 175a inside the cage, then the positioning tool is removed. After this step, the sun gear 151, the planet gears 150 and their axes 148 can be mounted. Finally, the impeller 120 is fixed on the planet gear carrier 130 using nuts screwed on the threaded portions of the nozzles. This mounting sequence is that preferred, even if there are other ones.

In the scope of the present invention, the inventors have sought to identify all the geometric parameters, which represent the distance between a nozzle and the sun gear. Starting with the head diameter of the sun gear, and by adding a mounting clearance there, a centring diameter of the impeller is obtained in the planet gear carrier. Then, a slight clearance is left for the mounting of the nozzle. This depends on the diameter of the pipeline and on the thickness of the O-ring. Material is then added onto the nozzles, by way of bosses, so as to increase the guiding length of the lubricant jet.

The invention claimed is:

1. A lubricant nozzle for a planetary gear set speed reducer of a turbomachine, said nozzle having a generally elongated shape and comprising a body with a longitudinal axis B, said body comprising a longitudinal inner cavity which is in fluid communication with a lubricant inlet located at a longitudinal end of said body and with lubricant outlet apertures which are formed in an annular wall of said body and which extend substantially radially with respect to said axis B, characterised in that said apertures are formed in at least one boss of said body, which projects radially outwards on said wall and which is at an angular extent about said axis less than 180°.

2. The nozzle according to claim 1, wherein the at least one boss has, in the transversal cross-section, a generally rectangular, triangular or trapezoidal shape.

3. The nozzle according to claim 2, wherein the trapezoidal boss comprises a small base which is defined by the radially outer end of the boss on which said apertures open, and edges which together form an angle of between 0 and 90°.

4. The nozzle according to claim 1, wherein said body comprises at least two bosses at a longitudinal distance from one another.

5. The nozzle according to claim 1, wherein said body comprises at least one outer annular groove for housing a sealing ring.

6. The nozzle according to claim 1, comprising a fixing leg formed of one single part with the body, said leg extending substantially in a plane perpendicular to said axis and comprising an aperture for the passage of a fixing means of a screw-nut or screw-tapped hole type.

7. An assembly comprising a planet gear carrier and nozzles according to claim 1, for a planetary gear set speed reducer of a turbomachine, said planet gear carrier comprising a cage defining an inner space for mounting a central sun gear of axis X of rotation and an annular row of planet gears arranged about the axis X and meshed with said sun gear, said sun gear comprising means for coupling to a first shaft, said cage comprising two substantially parallel annular walls centred on said axis X and a cylindrical wall connecting said annular walls at their outer periphery, a first of said annular walls being connected to a substantially cylindrical body comprising means for coupling to a second shaft, and a second of said annular walls comprising passages for the mounting of the nozzles, by moving each nozzle in a direction substantially parallel to said axis X, wherein said nozzles are configured to be mounted beforehand on said second wall from the inside of the cage.

8. The assembly according to claim 7, wherein said nozzles comprise a fixing leg formed of one single part with the body, said leg extending substantially in a plane perpendicular to said axis and comprising an aperture for the passage of a fixing means of the screw-nut or screw-tapped hole type, each said nozzle including a first longitudinal portion comprising said bosses and said fixing leg and a second threaded portion, the first portion of each nozzle being configured to extend inside said cage and the threaded portion being intended to receive a nut intended to bear on an outer face of said cage.

9. The assembly according to claim 8, wherein the threaded portion of each nozzle passes through, on the one hand, a housing of an impeller returned and fixed on said second wall of the cage, and on the other hand, a housing of this second wall.

10. An aircraft turbomachine, comprising a planetary gear set speed reducer including at least one nozzle according to claim 1.

11. An aircraft turbomachine, comprising a planetary gear set speed reducer including an assembly according to claim 7.

* * * * *